(12) United States Patent
Kuehnle (10) Patent No.: US 10,000,163 B2
(45) Date of Patent: Jun. 19, 2018

(54) APPARATUS AND METHOD FOR RESTORING A CAMERA MOUNTING TO A CALIBRATED POSITION

(71) Applicant: Bendix Commercial Vehicle Systems LLC, Elyria, OH (US)

(72) Inventor: Andreas U. Kuehnle, Villa Park, CA (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 31 days.

(21) Appl. No.: 15/468,160

(22) Filed: Mar. 24, 2017

(65) Prior Publication Data

US 2017/0232909 A1 Aug. 17, 2017

Related U.S. Application Data

(63) Continuation-in-part of application No. 14/882,776, filed on Oct. 14, 2015, now Pat. No. 9,637,064.

(51) Int. Cl.

| | |
|---|---|
| *B60R 11/04* | (2006.01) |
| *G03B 17/56* | (2006.01) |
| *H04N 5/225* | (2006.01) |
| *H04N 17/00* | (2006.01) |
| *B60R 11/00* | (2006.01) |

(52) U.S. Cl.
CPC ............ B60R 11/04 (2013.01); G03B 17/561 (2013.01); H04N 5/2252 (2013.01); H04N 17/002 (2013.01); *B60R 2011/004* (2013.01)

(58) Field of Classification Search
CPC .. B30R 11/04; B30R 2011/004; G03B 17/561
USPC ....................................................... 396/428
See application file for complete search history.

(56) References Cited

U.S. PATENT DOCUMENTS

| | | | |
|---|---|---|---|
| 2,547,550 A | 9/1947 | Whitmore | |
| 2,731,544 A | 11/1953 | Kayser | |
| 3,845,928 A | 11/1974 | Barrett | |
| 4,277,804 A * | 7/1981 | Robison | B60R 1/00 348/148 |
| 4,319,764 A | 3/1982 | Whitaker | |
| 5,042,763 A * | 8/1991 | Wong | F16M 13/02 224/265 |
| 5,109,364 A | 4/1992 | Stiner | |
| (Continued) | | | |

FOREIGN PATENT DOCUMENTS

GB 2314615 B 1/1998

OTHER PUBLICATIONS

"International Search Report and Written Opinion of International Searching Authority," report, dated Jan. 30, 2017, 9 pages, European Patent Office, Rijswijk Netherlands.

*Primary Examiner* — Clayton E LaBalle
*Assistant Examiner* — Linda B Smith
(74) *Attorney, Agent, or Firm* — Cheryl L. Greenly; Brian E. Kondas; Eugene E. Clair (57) ABSTRACT

Various examples of an apparatus for mounting a camera on a vehicle are disclosed. The apparatus includes a first bracket having a first end configured for attaching to a camera and a second end configured for mounting to a vehicle and a second bracket separate from the first bracket configured for holding the camera in a calibrated position. The second bracket is capable of deforming upon an impact to the apparatus and returning the camera to a calibrated position upon replacement.

12 Claims, 9 Drawing Sheets

(56) References Cited

U.S. PATENT DOCUMENTS

| | | | |
|---|---|---|---|
| 6,053,471 A | 4/2000 | Brown | |
| 6,164,804 A | 12/2000 | Self | |
| 6,663,298 B2 * | 12/2003 | Haney | G03B 17/00 |
| | | | 396/419 |
| 9,361,873 B2 | 6/2016 | Cicero | |
| 2003/0147641 A1 * | 8/2003 | Haney | G03B 17/00 |
| | | | 396/419 |
| 2011/0192951 A1 * | 8/2011 | Gooch | F16M 11/12 |
| | | | 248/316.7 |
| 2011/0240701 A1 | 10/2011 | Totani | |

* cited by examiner

APPARATUS AND METHOD FOR RESTORING A CAMERA MOUNTING TO A CALIBRATED POSITION

CROSS REFERENCE TO RELATED APPLICATIONS

The present application is a continuation-in-part of U.S. application Ser. No. 14/882,776 filed Oct. 14, 2015, the disclosure of which is incorporated herein in its entirety.

BACKGROUND

The present invention relates to examples of an apparatus and method for restoring a camera mounting to a calibrated position. Cameras are prevalent on commercial vehicles for providing back-up viewing, surround vehicle viewing and object detection. Cameras are generally mounted external to the vehicle to provide optimal views. To provide a precise view as required for proper system operation, the cameras are placed on a fixed bracket external to the vehicle. In one example, the bracket is adjusted to a calibrated position. In another example the position of the bracket is fixed, the camera learns the fixed position and the camera is calibrated to that position. During driving situations, the camera and its fixed bracket may be exposed to impact, which may move the camera out of its original calibrated position. If the camera is out of the calibrated position, the view provided to the object detection system and/or to the driver is out of alignment. Particular areas around the vehicle may no longer be under surveillance of a camera when it is out of the calibrated position and system performance may suffer. Therefore, there is a need for a way to restore the camera mounting to its calibration position.

SUMMARY

Various examples of an apparatus for mounting a camera on a vehicle are disclosed. An apparatus comprises a first portion of a first material with a first end configured for attaching to a camera and a second end configured for mounting to a vehicle. The apparatus is configured to maintain the camera in a calibrated position. A second portion of a second material is coupled to the first portion, wherein the second material is capable of deforming upon an impact to the apparatus and returning the apparatus to the calibrated position upon exposure to an energy source.

Various examples of an assembly for a camera mounting are disclosed. The assembly comprises a camera and a bracket comprising a first portion with an end for fastening to the camera. The bracket includes a second portion coupled to the first portion with a shape memory material in a first form. The second portion is capable of deforming upon an impact to the apparatus and reforming to the first form upon exposure to an energy source.

Additional examples of an apparatus for mounting a camera on a vehicle include assemblies having a first bracket having a first end configured for attaching to a camera and a second end configured for mounting to a vehicle and a second bracket separate from the first bracket configure for holding the camera in a calibrated position. The second bracket is capable of deforming upon an impact to the apparatus; and returning the camera to a calibrated position upon replacement.

An example of a method of configuring a camera assembly for a vehicle is disclosed. The method comprises fastening a camera on a first end of a bracket and fastening a second end of the bracket to a vehicle. The bracket comprises a portion between the first end and the second end with a shape memory material in a predetermined form. The method includes calibrating the camera assembly, determining the camera assembly is no longer in the calibrated position and exposing the shape memory material to an energy source such that the shape memory material returns to the predetermined form.

Another example of a method of configuring a camera assembly for a vehicle comprises fastening a camera on a first end of a first bracket and affixing a second end of the first bracket to a vehicle and fastening a second bracket to the camera and the vehicle such that the second bracket holds the camera in a calibrated position. Upon impact to the camera assembly, the second bracket deforms preferentially in response to the impact. When the second bracket is replaced, the camera is returned to a calibrated position.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
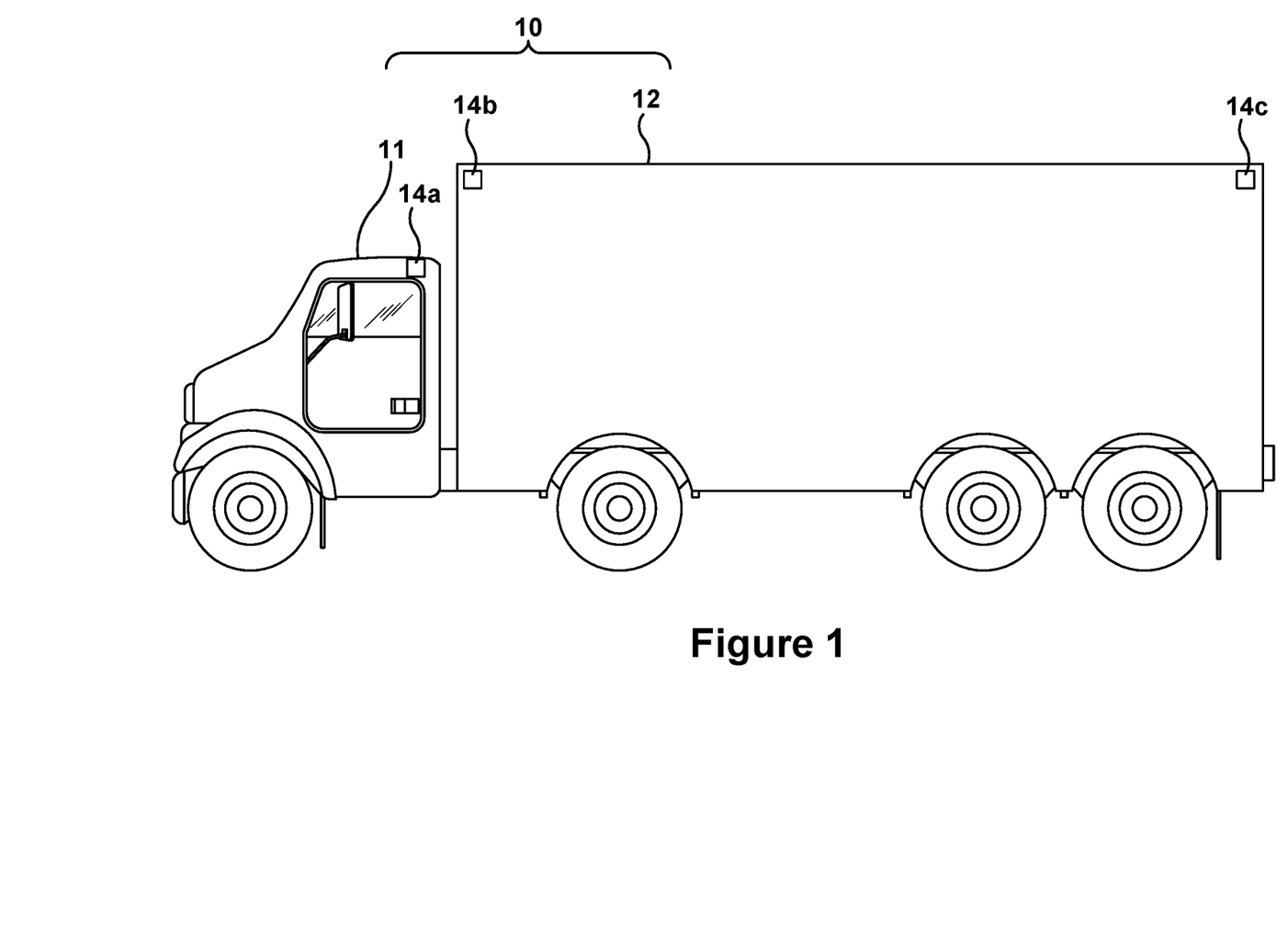
FIG. 1 illustrates a schematic representation of commercial vehicle equipped with cameras on the tractor and trailer according to an example of this invention.

With reference to FIG. 1, a commercial vehicle 10 is shown. The commercial vehicle 10 includes a tractor 11 and a trailer 12. The tractor 11 includes a camera assembly 14a. The trailer 12 includes a first camera assembly 14b and a second camera assembly 14c. There may be more or fewer camera assemblies on each portion of the commercial vehicle 10.

Each camera assembly 14a, 14b, 14c is placed relatively high on the structure of the commercial vehicle 10 in order to obtain a view around the commercial vehicle 10. As will be explained, each of the camera assemblies 14a, 14b, 14c are calibrated when installed to maintain a view of the area around the commercial vehicle 10. The camera assemblies 14a, 14b, 14c may be part of an imaging system, such as used for vehicle back up alarms, object detection or surround view.

The camera assemblies 14a, 14b, 14c extend beyond the profile of the tractor 11 and trailer 12. As such, the camera assemblies 14a, 14b, 14c are more likely to be exposed to impact with objects, such as tree limbs, signs and garage entryways, while the commercial vehicle 10 is in service. Impact to a camera assembly is detrimental because, for example, a surround view system relies on a precise geometric relationship among the views provided by each camera assembly around the vehicle. If the relationship among the camera views is changed due to an impact to one of the camera assemblies, there will be artifacts in the surround view image and the imaging system's ability to interpret objects in the image will be deleteriously affected.

Each of the camera assemblies 14a, 14b, 14c includes a camera. The cameras 14a, 14b, 14c may be of the same type, for example the Blue Eagle digital camera from Silicon Micro Sensor GmbH. Each of the camera assemblies 14a, 14b, 14c includes a bracket to affix the camera to the tractor 11 or trailer 12, as will be described.

Figure 2:
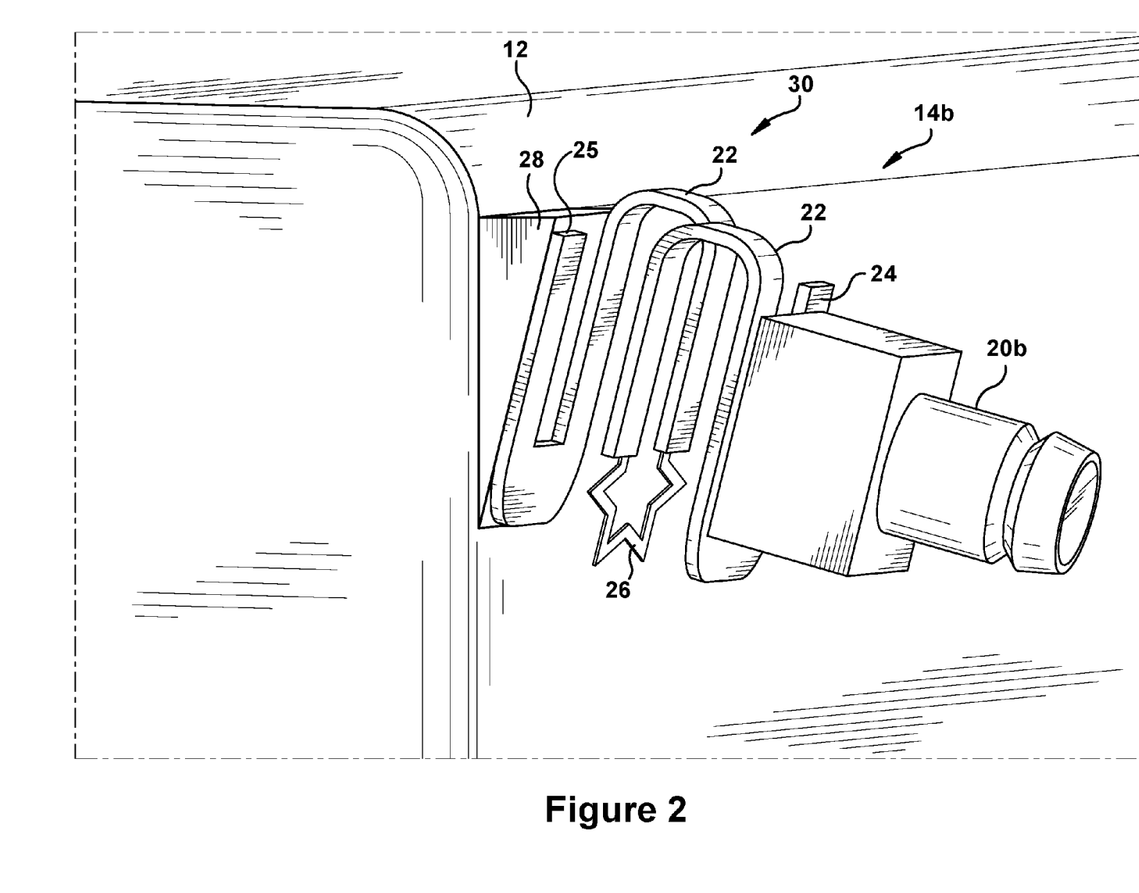
FIG. 2 illustrates a camera assembly with a bracket according to an example of the present invention.

With reference to FIG. 2, assembly 14b as affixed to the trailer 12 includes a camera 20b. The camera 20b is shown affixed to a bracket 30 on a side of trailer 12. The bracket 30 maintains the camera 20b in a substantially stable position during normal operation of the commercial vehicle 10. The imaging system with camera 20b is generally calibrated after the camera 20b is installed on the vehicle and no adjustments would be made to the bracket 30.

The bracket 30 includes a first portion 22 with a first end 24 configured for receiving the camera 20b. The camera 20b can be fastened to the first end 24 by mechanical fasteners, adhesives or other means. The first portion 22 includes a second end 25 configured for affixing to the trailer 12. The second end 25 of the bracket 30 may optionally be attached to a base portion 28, which is then affixed to the trailer 12. The first portion 22 may be a rigid material, such as steel, aluminum or industrial plastic.

The bracket 30 includes a second portion 26, which separates the first end 24 and the second end 25 of the first portion 22. In one example, the second portion 26 is in at the approximate midpoint between the first end 24 and the second end 25. In another example, the second portion 26 is a different shape than the first portion 22. The structure of the second portion 26 is such that it is isotropically weakened or selectively directionally weakened. Any impact to the camera assembly 14b will cause deflection or deformation at the weaker second portion 26 prior to causing any deformation to the first portion 22. In the example in FIG. 2, the shape of the second portion 26 is a folded or spring shape. The shape of the first portion 22 may be an S-shaped curve. The shape of the second portion 26 may be that of a three dimensional space-filling curve, where there is not a single direction of the second portion 26 that is stronger than any other direction.

The second portion 26 comprises a material different than the first portion 22. The material of the second portion 26 can be a shape memory alloy, such as Nitinol or similar material. The shape memory alloy is first set in a custom predetermined form, such as the shape shown in FIG. 2. Shape setting is accomplished by constraining the shape memory material in the desired position and applying an energy source, such as heat or electricity. Because of the expense of the shape memory material, the section of the bracket 30 of the second portion 26 may be shorter than the section of the bracket 30 comprising the first portion 22. In one example, the second portion 26 is less than 10% of the overall length of the bracket 30.

Shape memory alloys exhibit characteristics wherein a shape is set into the material at a low temperature and the shape memory alloy will return to the set shape upon exposure to a high temperature. The shape memory alloy section is made weaker than the material of the first portion 22 of bracket 30 by virtue of its form and dimensions. Upon impact to any point on the camera assembly 14b, the view of camera 20b may be shifted and no longer be in its calibrated position. The shape memory alloy portion 26 has a yield strength less than the first portion 22 so that the second portion 26 preferentially deforms before the first portion 22. For example, the yield force of the second portion 26 may be between about 10 pounds and 20 pounds force. Deformation to the second portion 26 can be corrected using the method described herein, since a shape memory alloy returns to its original shape when exposed to an energy source, such as heat. However, since a heat source may be above 100C, for example, it is advantageous if the camera 20b is protected by a heat shield element (not shown). The camera 20b is then returned to its original calibrated position. Therefore, the entire bracket 30 would not have to be replaced after impact nor would the imaging system and camera 20b require an extensive recalibration to ensure the camera 20b is in the correct position.

In another example, the first portion 22 located closest to the second portion 26 and the second portion 26 would be coated, with epoxy paint for example. If the bracket 30 were subject to deformation, the paint would craze, crack or flake. The crazing, cracking or flaking gives the driver a visual means to determine that the bracket 30 has been moved out of its calibrated position.

In another example, the second portion 26 of the bracket 30 may be a standardized shape. The second portion 26 of the bracket 30 would be replaceable so that if the shape memory material could not return to its original predetermined form, the second portion 26 could be substituted with a new bracket portion.

Figure 3:
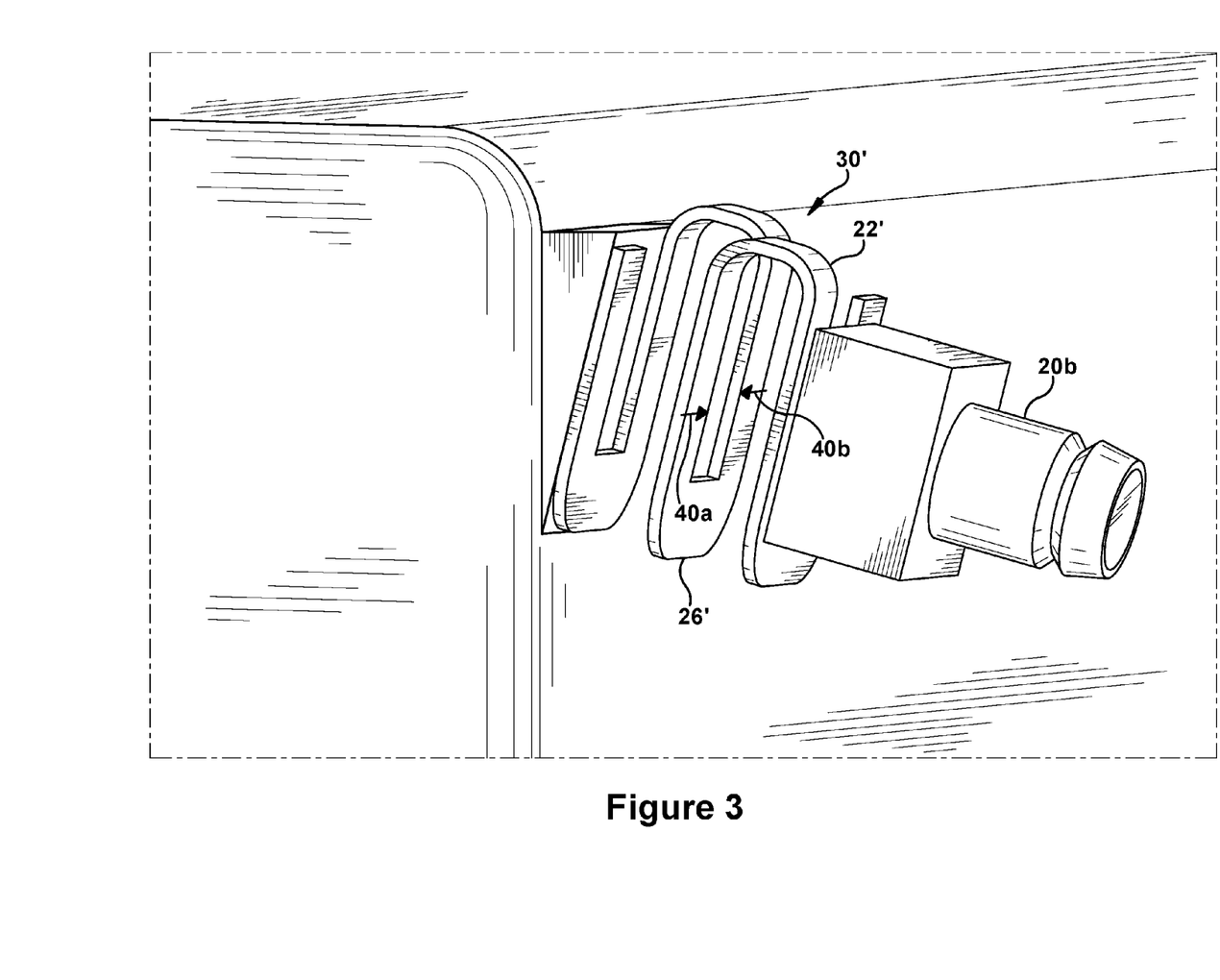
FIG. 3 illustrates a camera assembly according to another example of the present invention.

FIG. 3 illustrates another example of a camera assembly 14b. In this example, the first portion 22' and the second portion 26' of the bracket 30' are a single piece made of the same material. The material may be shape memory material, such as Nitinol. In this example, the first portion 22' and the second portion 26' are in a predetermined shape of two S-curves in non-coincident planes. In case of impact to the camera assembly 30', the entire bracket 30' will be deformed and the entire bracket 30' would need to be subject to the energy source to be reformed to the predetermined shape.

The bracket 30' of FIG. 3 also includes an indicator means. The bracket 30' includes an indicator feature 40a on the first portion 22' and an indicator feature 40b on another section of the first portion 22'. The indicator feature 40a can be an arrow that would be in alignment with the indicator feature 40b arrow when the bracket 30' is in the calibrated position prior to impact.

As shown in FIG. 3, the indicator feature 40a is not in alignment with indicator feature 40b, which may be due to an impact to the bracket 30' that deformed the first portion 22' or the second portion 26'. In this example, a driver or a technician for the commercial vehicle 10 could see that the bracket 30' has likely sustained an impact, causing the indicators features 40a, 40b to be out of alignment. The technician could then use the method described herein to reform the bracket 30' to its calibrated position.

In another example, the bracket 30' would be within the view of another camera on the vehicle 10, such as camera 20c. Camera 20c would determine that the camera 20b is out of alignment by recognizing during image processing of bracket 30' that indicator feature 40a is out of alignment with indicator feature 40b. The imaging system could then provide an electronic indicator, such as a lamp, to the driver to let him know that the bracket 30' out of alignment.

In another example, the first portion 22' and the second portion 26' would be coated, with epoxy paint for example. If the bracket 30' were subject to deformation, the coating would craze, crack or flake; thereby providing the driver another visual means to determine that the bracket 30' has been moved out of its calibrated position. In another example, a more compliant or adhesive coating of a second contrasting color would be coated directly on the bracket 30'. The more craze prone coating would be added over the more compliant coating. When the top layer of craze prone coating crazes, cracks or flakes, the second color coating would be visible, making it easier to see that the bracket 30' had deformed.

Another method to determine that the bracket 30' is no longer in the calibrated position is that the field of view of the camera 20b changes after impact. The imaging system can then indicate to the driver or technician that the camera 20b is no longer in the calibrated position.

Figure 4:
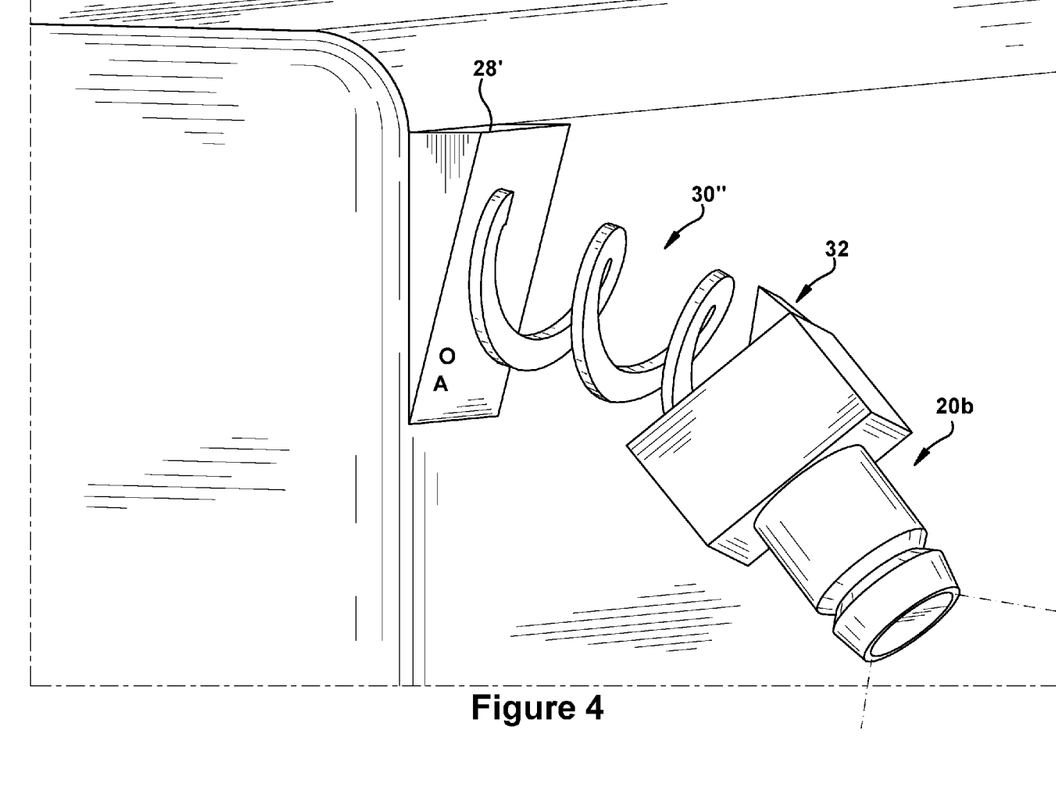
FIG. 4 illustrates a camera assembly according to another example of the present invention.

FIG. 4 illustrates another example of camera 20b and bracket 30". In this example, the entire bracket 30" is made of a shape memory material. The bracket 30" is mounted to a base 28". In this example, the bracket 30" is shaped in a helical shape or twisted ribbon shape. In this shape, the bulk of any impact will be absorbed by the bracket 30".

Optionally, the camera 20b includes an aiming device 32. The aiming device 32 is calibrated to view a particular point A on the base 28". If the aiming device 32 no longer sees point A on base 28", the imaging system can automatically determine that the camera 20b is no longer in the calibrated position. The aiming device 32 may be another camera. The aiming device 32 may be a light transmitting device. Point A may be a reflective device so that the aiming device 32 determines the camera 20b is in the calibrated position as long as the aiming device 32 is receiving a reflection. If the camera 20b receives an impact and the bracket 30" is moved out of the calibrated position, then the light beam would no longer be reflected from Point A.

Figure 5:
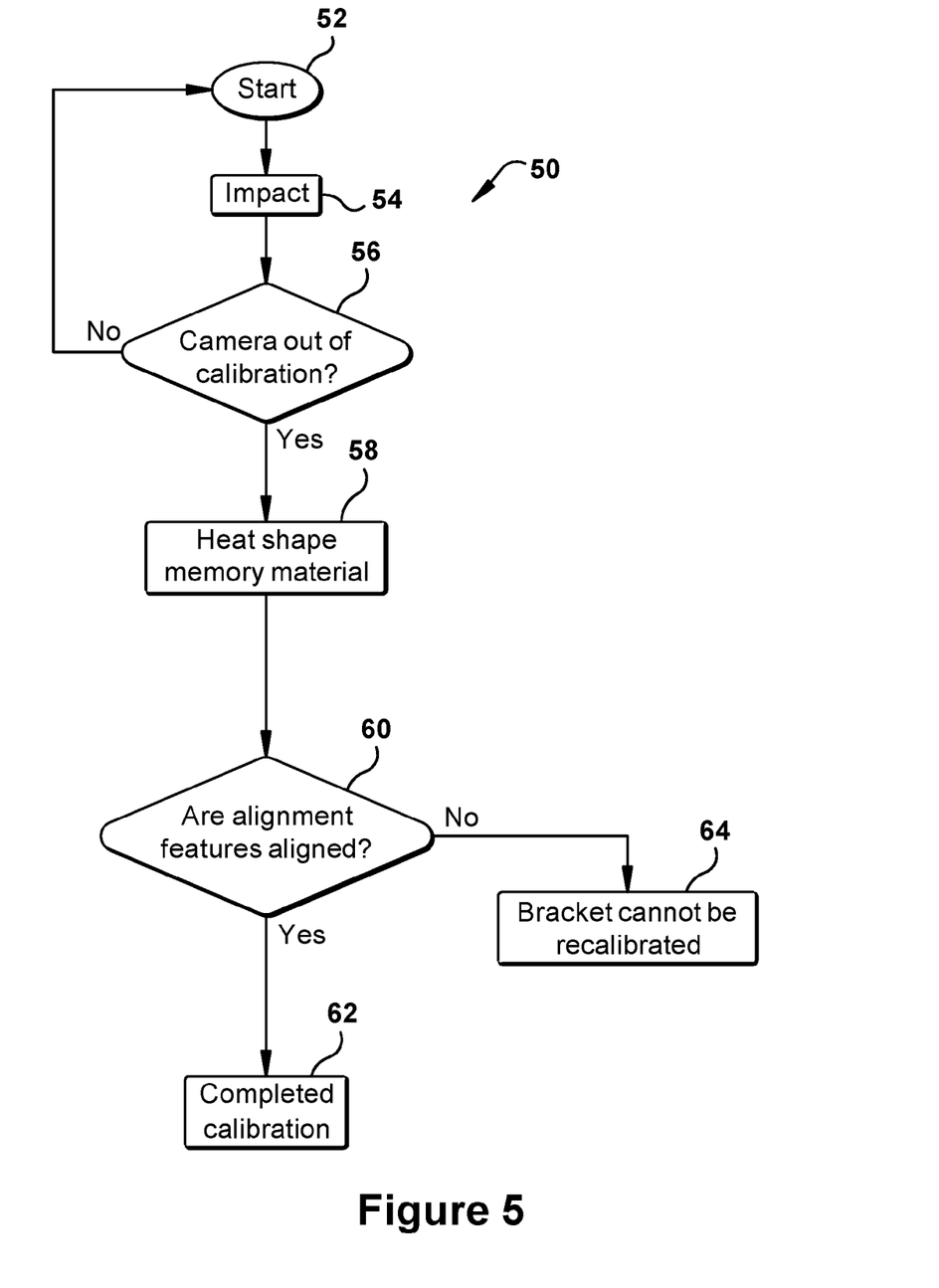
FIG. 5 illustrates a method of restoring a camera bracket to a calibrated position.

FIG. 5 illustrates a flowchart for implementing a method 50 of calibrating the camera assembly, such as camera assembly 14b. The method 50 begins at step 52.

In step 54, the camera assembly 14b receives an impact, which could be from a tree while the vehicle 10 is traveling down the road, for example. The camera assembly 14b may be forcibly moved out of its calibrated position by means of this external force. If the force is greater than the yield strength of the second portion 26 of the bracket 30, the second portion 26 made of the shape memory alloy is plastically deformed. For example, the yield force of the second portion 26 may be between about 10 pounds and 20 pounds force. This yield force is less than the first portion 22 of the bracket 30.

The camera 20b is determined to be out of calibration in step 56, either by the visual alignment means or the coating means as described above. If the camera 20b is out of calibration, the method 50 continues to step 58. If it is determined that the camera 20b is not out of calibration, the method returns to step 52.

If the camera is out of calibration, the next step 58 is to heat the second portion 26 of the bracket 30. Since the heat must be above 100C, for example, it is advantageous if the camera 20b is protected by a heat shield element. The heat can be applied in step 58 by direct forced air or electric means. A vehicle technician can apply the heat to the bracket 30.

In step 60, it must be determined if the camera 20b is still out of calibration. The visual alignment means can be used in this instance, such that the heat applied by the vehicle technician can cease when he can view that the alignment features 40a, 40b are realigned. The automatic alignment using the optical method described above may also be used. If the features are realigned, the method moves to step 62, where the calibration is completed.

If the features are not realigned, it is determined that the bracket cannot be recalibrated in step 64. In this instance, an entirely new bracket 30 may need to be placed on the vehicle. In some instances, the impact to the bracket may have exceeded the yield strength of the first portion 22 of the bracket 30.

In another style of camera assembly, the attachment function can be separated from the locating function of the assembly. A strong, but flexible, attachment means ensures the camera will not be disassociated from the vehicle in case of impact. An elastic, but structurally weaker, location means ensures that in case of impact to the camera assembly, the camera can be easily returned to the calibrated position by fixing or replacing only the location means. The location means may be made of a less expensive material than the attachment means. Further descriptions of such dual acting camera assemblies are described herein.

Figure 6:
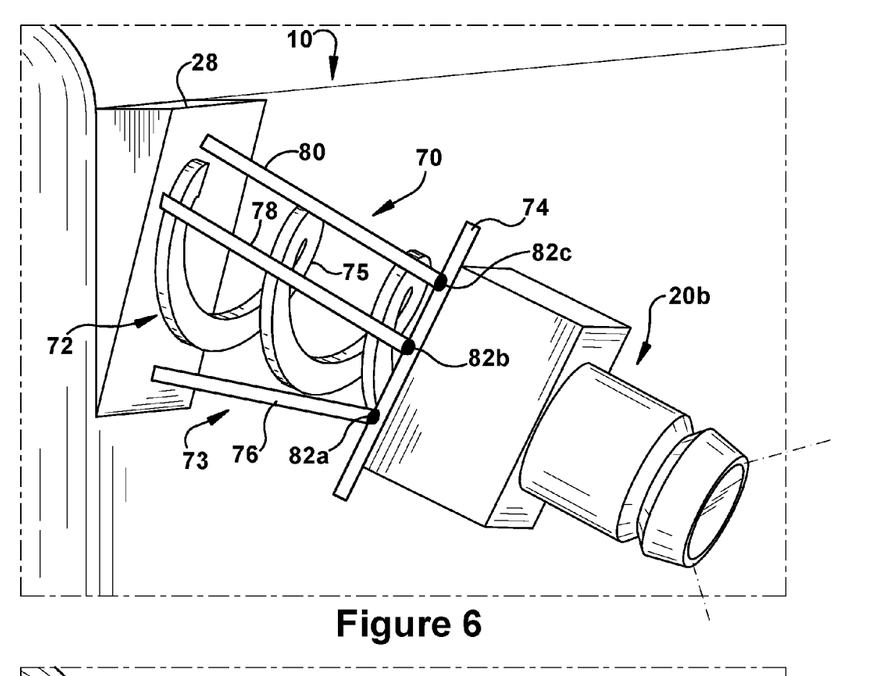
FIG. 6 illustrates a camera assembly according to another example of the present invention.

FIG. 6 illustrates an example of camera 20b mounted to the vehicle using a camera mounting assembly 70. The camera mounting assembly 70 includes a first bracket 72 and a second bracket 73 arranged in a constructionally parallel manner.

In this example, the first bracket 72 is an attachment mechanism, shown as a helical spring 75 in FIG. 6. However, other structures are contemplated, especially structures with multiple axes of motion to withstand compressive, shear and rotational forces. The purpose of the first bracket 72 is to hold the camera 20b to the base 28 on the vehicle 10. The first bracket 72 may be connected directly to the camera 20b or may be connected to a camera base 74 that is connected to the camera 20b. The first bracket 72 is a relatively flexible and strong material, capable of maintaining the connection between the camera 20b and the vehicle 10 when exposed to high vibration and other events during operation of the vehicle. The material of the first bracket 72 may be steel or fabric, such as Kevlar cord.

In one example, the first bracket 72 would be coated, with epoxy paint for example. If the non-flexible portions of first bracket 72 were subject to deformation, the paint would craze, crack or flake. The crazing, cracking or flaking gives the driver a visual means to determine that the first bracket 72 has been subjected to a deleterious force.

The first bracket 72 is preferably mounted interior of the second bracket 73, protecting the first bracket 72 while making servicing of the second bracket 73 easier. The purpose of the second bracket 73 is to position and maintain the camera 20b in its calibrated position. The second bracket 73 will also absorb the bulk of any impact to the entire mounting assembly 70. Second bracket 73 may be elastic and may thus temporarily deform. Alternatively, the second bracket 73 may be brittle, and thereby preferentially fail in order to protect the first bracket 72. In one example, the posts 76, 78, 80 are of a spring steel or ceramic material. The second bracket 73 is capable of returning the camera 20b to the calibrated position, but is still sufficiently weak such that the second bracket 73 fails when desirable to do so. The failure may be by shearing, snapping off, buckling, twisting off or stretching to complete separation from the camera mounting assembly 70.

In this example, the second bracket 73 is an assembly of three posts 76, 78, 80. At least two posts are required, but more than three may be used. The three posts 76, 78, 80 are relatively the same shape and size. The three posts 76, 78, 80 are positioned in a structurally asymmetrical shape between the base 28 and the camera base 74. An example of such an asymmetrical shape may be two aligned differently sized equilateral triangles whose corners are connected to the opposite triangle's corners. The alignment may be visualized such that the smaller triangle is initially centrally contained within the larger one, and has its edges parallel to the larger one. The triangles are then twisted relative to each other, such that the connections are tilted away from vertical and no longer parallel. This angular arrangement allows the posts 76, 78, 80 to flex elastically downward, if the assembly 70 is subjected to an end on impact. This movement of the second bracket 73 is a vectorial consequence of its geometry.

The posts 76, 78, 80 may be affixed to the vehicle base 28 using any attachment means, such as mechanical fastening, gluing or other means. The posts 76, 78, 80 are then removably affixed to the camera base 74 at sockets 82a, 82b, 82c, as will be described. Alternatively, the posts 76, 78, 80 may be slid through openings in the camera base 74 into mating openings in the base 28. Since the posts 76, 78, 80 are of a different material than first bracket 72, they are designed to absorb and/or yield under excessive force prior to the first bracket 72. In case of the camera 20b being exposed to excessive force, the posts 76, 78, 80 may break but the force ideally will not be transmitted to the first bracket 72. In this example, a driver or a technician for the commercial vehicle 10 could see that the assembly 70 has likely sustained an impact, causing the posts 76, 78, 80 to deform, break or fall out of position. The technician could then use the method described herein to replace the posts 76, 78, 80 and return the camera 20b to its calibrated position. The posts 76, 78, 80 are easily replaceable, and subsequently return the camera 20b to a calibrated position when replaced. In another example, the posts 76, 78, 80 may be of different lengths, or may be color coded with the corresponding endpoints for each marked in this same color, to further identify the proper installation location.

Figure 7:
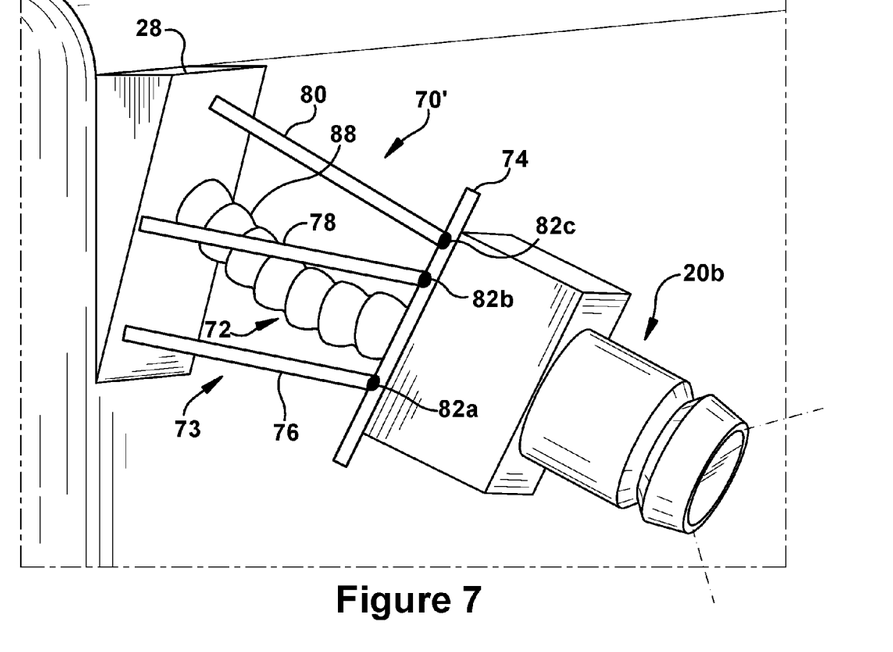
FIG. 7 illustrates a camera assembly according to another example of the present invention.

FIG. 7 illustrates another example of a camera mounting assembly 70'. The second bracket 73 remains the same three post configuration as in FIG. 6, but the first bracket 72 is a ball socket tubing attachment mechanism 88. The ball socket tubing attachment mechanism 88 allows for mounting the camera 20b at an angle from the base 28 of the vehicle such that the camera 20b can move freely with the application of force. The ball socket tubing attachment mechanism 88 may also be placed in the shape of a helix for additional strength. Since there are multiple moving parts in the ball socket tubing attachment mechanism 88, arbitrary motion may be imposed when initially installing the assembly 70'. Therefore, this alternative structure of the first bracket 72 allows for strength and flexibility in the attachment means. The dual functions of location and secure attachment of the camera assembly 70' are separated by this constructionally parallel design.

Figure 8A:
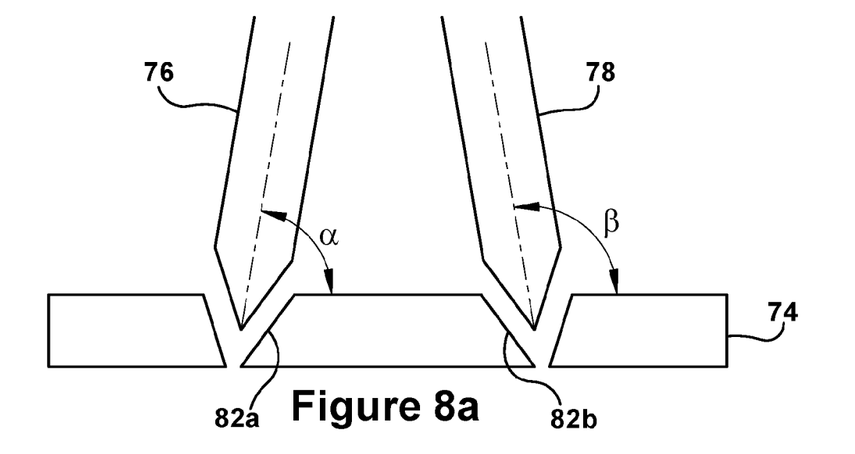
FIGS. 8A and 8B illustrate cross-sectional views of a camera base having differing attachment means.

FIG. 8A illustrates a cross-section of a partial portion of the camera base 74 where the posts 76, 78 would slide into the camera base 74 at chamfered sockets 82a, 82b. Post 76 enters the chamfered socket 82a at an angle alpha α relative to the plane of the camera base 74. Angle alpha α may be about eighty (80) degrees. Post 78 enters the chamfered socket 82b as an angle beta β relative to the plane of the camera base 74. Angle beta β may be about one hundred (100) degrees.

Therefore, the posts 76, 78 are in a structurally weaker, non-parallel position but still work together to position the camera 20b in the calibrated position. The design of the chamfered sockets 82a, 82b allows for the posts 76, 78 to slip out of the chamfered sockets 82a, 82b rather than break in response to an impact to the camera assembly 70.

Figure 8B:
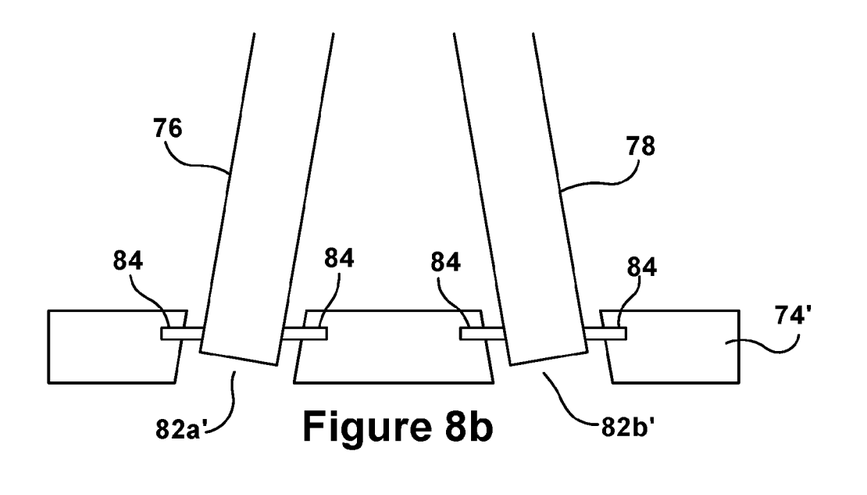

FIG. 8B shows a cross-section of a portion of a camera base 74' according to another example of the invention, where the posts 76, 78 slide into sockets 82a', 82b'. The posts 76, 78 are held in the sockets 82a', 82b' by spring loaded pins 84. The posts 76, 78 remain angled as described in FIG. 8A. The spring loaded pins 84 hold the posts 76, 78 in place, but do not permanently secure them to the camera base 74'. The design of the pins 84 allow for the posts 76, 78 to slip out of the sockets 82a', 82b' rather than break in response to an impact to the camera assembly 70.

In another example using this configuration, the posts 76, 78, 80 may be slid through the sockets 82a', 82b', 82c' in the camera base 74 into mating openings in the base 28.

Figure 9:
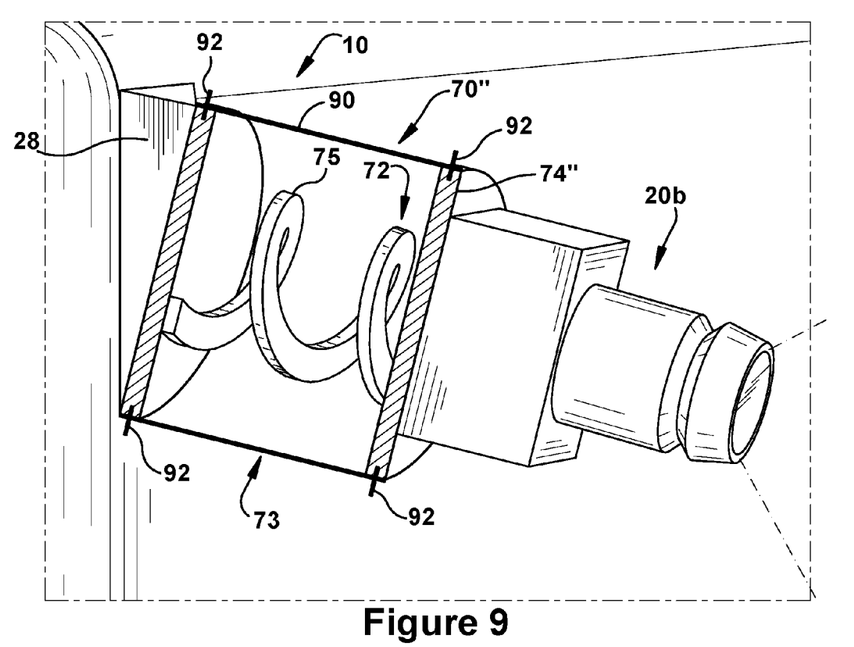
FIG. 9 illustrates a camera assembly according to another example of the present invention.

FIG. 9 illustrates another example of a camera mounting assembly 70". The first bracket 72 remains a helical spring 75 as in FIG. 6. The second bracket 73 is constructed as a relatively thin sleeve 90 that surrounds the first bracket 72. The sleeve 90 may be spring reinforced or may be shaped as a broad spring steel helix. In one example, the sleeve 90 is made of spring steel with a relatively thinner central section. The sleeve 90 may slide over the modified camera base 74" and base 28 on the vehicle 10. Pins 92 may slide from the outside of the sleeve 90 into the camera base 74" and/or base 28 to hold the sleeve 90 over the first bracket 72. The sleeve 90 is designed to fail by buckling in response to an impact, preventing any damage to the first bracket 72. When the sleeve 90 is replaced, the camera 20b is returned to its calibrated position. The dual functions of location and attachment of the camera assembly 70" are separated by this constructionally parallel design.

Figure 10:
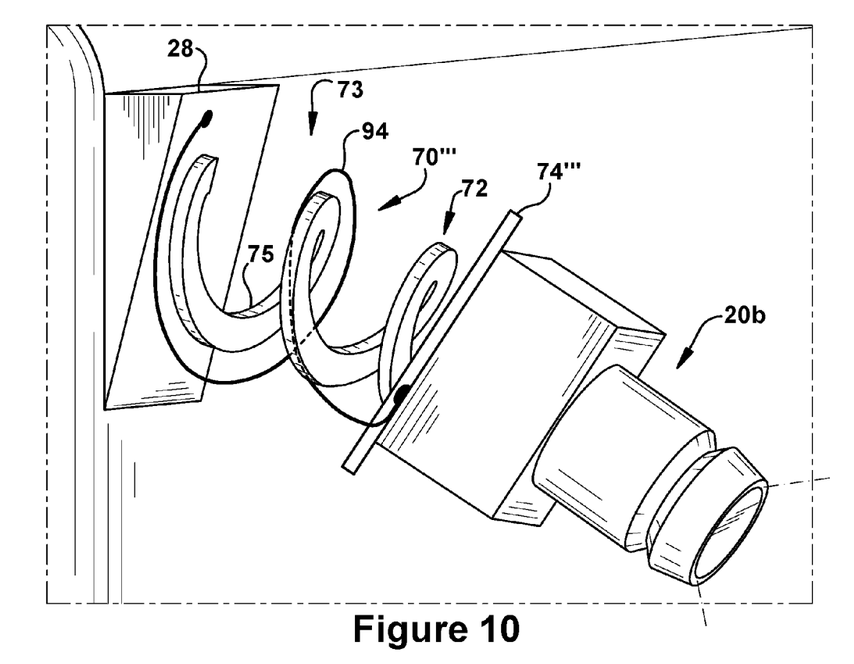
FIG. 10 illustrates a camera assembly according to another example of the present invention.

FIG. 10 illustrates another example of a camera mounting assembly 70'''. The first bracket 72 remains a helical spring 75 as in FIG. 6. The second bracket 73 is a thin, elastic spring 94 surrounding the first bracket 72. In one example, the helical spring 75 is of a spring wire material. A first end of the spring 94 is removably attached to the base 28 and a second end of the spring 94 is removable attached to the modified camera base 74'''. The spring 94 is designed to fail in response to an impact prior to the first bracket 72. When the spring 94 is replaced, the camera 20b is returned to its calibrated position. The dual functions of location and attachment of the camera assembly 70''' are separated by this constructionally parallel design.

It is understood than any combination of styles of the first bracket 72 used to attach a camera to the vehicle and the second bracket 73 used to locate a camera into a calibrated position as described herein may be used to create a camera assembly. In this manner, a camera exposed to a potentially destructive force may first lose only its positioning, or calibration, rather than being fully removed from the vehicle due to the failure of a single bracket.

Therefore, an apparatus for mounting a camera on a vehicle includes a first bracket having a first end configured for attaching to a camera and a second end configured for mounting to a vehicle and a second bracket separate from the first bracket configured for holding the camera in a calibrated position. The second bracket is capable of deforming upon an impact to the apparatus and returning the camera to a calibrated position upon replacement.

Figure 11:
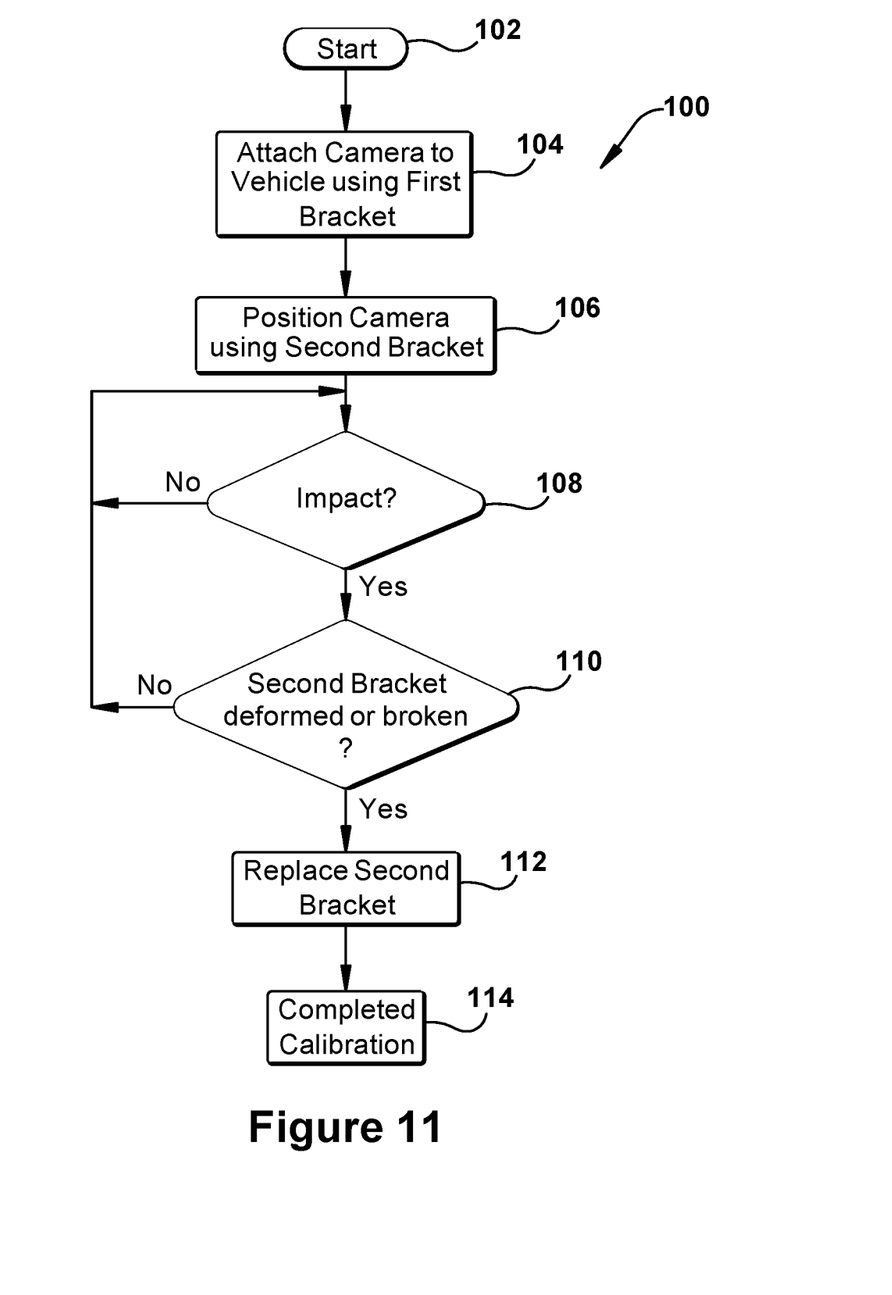
FIG. 11 illustrates another method of restoring a camera to a calibrated position.

FIG. 11 illustrates a flowchart for implementing a method 100 of calibrating a camera assembly, such as the camera assemblies shown in FIGS. 6, 7, 9 and 10. The method 100 begins at step 102.

In step 104, a camera, such as camera 20b, is attached to the vehicle using the first bracket 72. In step 106, the camera 20b is positioned in a calibrated position using the second bracket 73.

In step 108, it is determined whether the camera 20b or second bracket 73 received an impact, which could be from a tree while the vehicle is traveling down the road, for example. If no impact occurred, the method 100 remains at step 108. If an impact has occurred, the camera assembly 20b may be forcibly moved out of its calibrated position by means of this external force. If the force is greater than the yield strength of the second bracket 73, the second bracket 73 is plastically deformed or broken. In step 110, the camera 20b would be determined to be out of calibration by visual inspection of the state of the second bracket 73 as described previously. If the second bracket 73 is not deformed or broken, then the method 100 returns to step 108.

In step 112, the second bracket 73 is replaced. Because of the straightforward design of the second bracket 73, replacement can be completed more quickly and less expensively as compared to replacing an entire camera assembly. In step 114, calibration of the camera is completed upon replacement of the second bracket 73.

Therefore, a method of configuring a camera assembly for a vehicle comprises fastening a camera on a first end of a first bracket; affixing a second end of the first bracket to a vehicle and fastening a second bracket to the camera and the vehicle such that the second bracket holds the camera in a calibrated position. Upon impact to the camera assembly, the second bracket deforms preferentially in response to the impact. When the second bracket is replaced, the camera is returned to a calibrated position.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

I claim:

1. An apparatus for mounting a camera on a vehicle comprising:
    a first bracket having a first end configured for attaching to a camera and a second end configured for mounting to a vehicle; and
    a second bracket separate from the first bracket configured for holding the camera in a calibrated position, wherein the second bracket is capable of:
        deforming upon an impact to the apparatus; and
        returning the camera to a calibrated position upon replacement.

2. The apparatus as in claim 1, wherein the first bracket is one of a helical spring and a ball socket tube.

3. The apparatus as in claim 1, wherein the second bracket comprises at least two posts in a non-parallel configuration.

4. The apparatus as in claim 3, wherein the at least two posts are attached to the camera via chamfered sockets.

5. The apparatus as in claim 3, wherein the at least two posts are attached to the camera via spring pins in sockets.

6. The apparatus as in claim 3, wherein each of the at least two posts is arranged at a different angle from a plane of the camera.

7. The apparatus as in claim 1, wherein the second bracket is a cylindrical shape or a helical shape surrounding the first bracket.

8. The apparatus as in claim 1, wherein the first bracket and second bracket are constructed of different materials, wherein the material of the second bracket has a lower yield strength than the material of the first bracket.

9. An assembly for a camera mounting comprising
    a camera;
    a first bracket having a first end for fastening to the camera and a second end for mounting to a vehicle;
    a second bracket separate from the first bracket configure for holding the camera in a calibrated position, wherein the second bracket is capable of:
        deforming upon an impact to the apparatus; and
        returning the camera to a calibrated position upon replacement.

10. The assembly as in claim 9, wherein the first bracket and second bracket are constructed of different materials, wherein the material of the second bracket has a lower yield strength than the material of the first bracket.

11. The assembly as in claim 9, wherein the second bracket surrounds the first bracket and the second bracket is in a shape of a helical spring, three non-parallel legs or a cylinder.

12. A method of configuring a camera assembly for a vehicle comprising:
    fastening a camera on a first end of a first bracket;
    affixing a second end of the first bracket to a vehicle;
    fastening a second bracket to the camera and the vehicle such that the second bracket holds the camera in a calibrated position;
    impacting the camera assembly; wherein the second bracket deforms preferentially in response to the impact; and
    replacing the second bracket to return the camera to a calibrated position.

* * * * *